US005635674A

United States Patent [19]
Owen

[11] Patent Number: 5,635,674
[45] Date of Patent: Jun. 3, 1997

[54] SEALED PASSAGE FOR ELECTRICAL LEADS ACROSS A BARRIER

[76] Inventor: Donald W. Owen, 5100 NW. 26th, Oklahoma City, Okla. 73127

[21] Appl. No.: 259,009

[22] Filed: Jun. 13, 1994

[51] Int. Cl.[6] .................................................. H02G 3/18
[52] U.S. Cl. ................................ 174/65 R; 174/152 R; 174/DIG. 8
[58] Field of Search .................... 174/65 R, 65 SS, 174/65 G, DIG. 8, 151, 152 R, 153 G, 38

[56] References Cited

U.S. PATENT DOCUMENTS

| 3,423,518 | 1/1969 | Weagant | 174/DIG. 8 |
|---|---|---|---|
| 3,841,032 | 10/1974 | Grannis, III | 174/38 X |
| 4,234,218 | 11/1980 | Rogers | 174/DIG. 8 |
| 4,345,804 | 8/1982 | Lanoue | 174/152 R X |
| 4,625,072 | 11/1986 | VanBrunt | 174/65 SS X |
| 4,670,625 | 6/1987 | Wood et al. | 174/152 R X |
| 4,849,582 | 7/1989 | Stevenson | 174/DIG. 8 |
| 4,852,252 | 8/1989 | Ayer | 174/DIG. 8 |
| 4,879,799 | 11/1989 | Sovish et al. | 174/DIG. 8 |
| 4,993,149 | 2/1991 | Zilligen et al. | 174/DIG. 8 |

Primary Examiner—Kristine L. Kincaid
Assistant Examiner—Dean A. Reichard
Attorney, Agent, or Firm—Dougherty, Hessin, Beavers & Gilbert

[57] ABSTRACT

An assembly of heat shrink tubes provides an interface across a barrier, such as a boundary of a chamber of a transformer housing. Each of the tubes has an axial aperture for receiving at least one respective electrical lead, such as ones extending from a transformer disposed in the chamber of the transformer housing to a connection outside the chamber. The interface preferably also includes a plurality of bushings, wherein each of the bushings is disposed in the axial aperture of a respective one of the heat shrink tubes. A support member is preferably included so that the heat shrink tubes are disposed adjacent a plurality of holes defined through the support member. An adhesive fluid tightly connects the heat shrink tubes to the support member. The chamber of the transformer housing includes a wall having an inner surface, against which an insulating liquid is disposed, and an outer surface, against which a gas is disposed. The heat shrink tubes can be mounted to this wall, such as by bolted attachment of the support member.

17 Claims, 2 Drawing Sheets

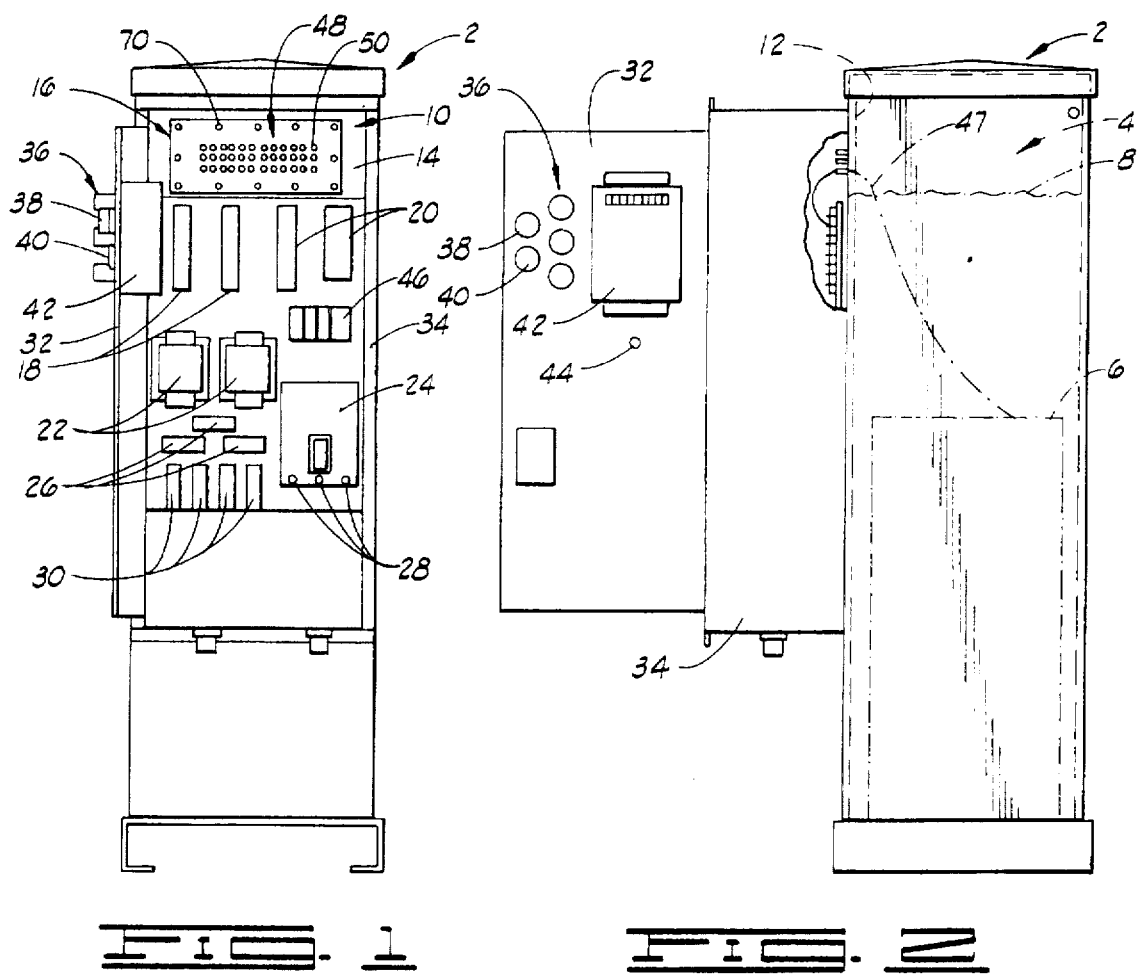
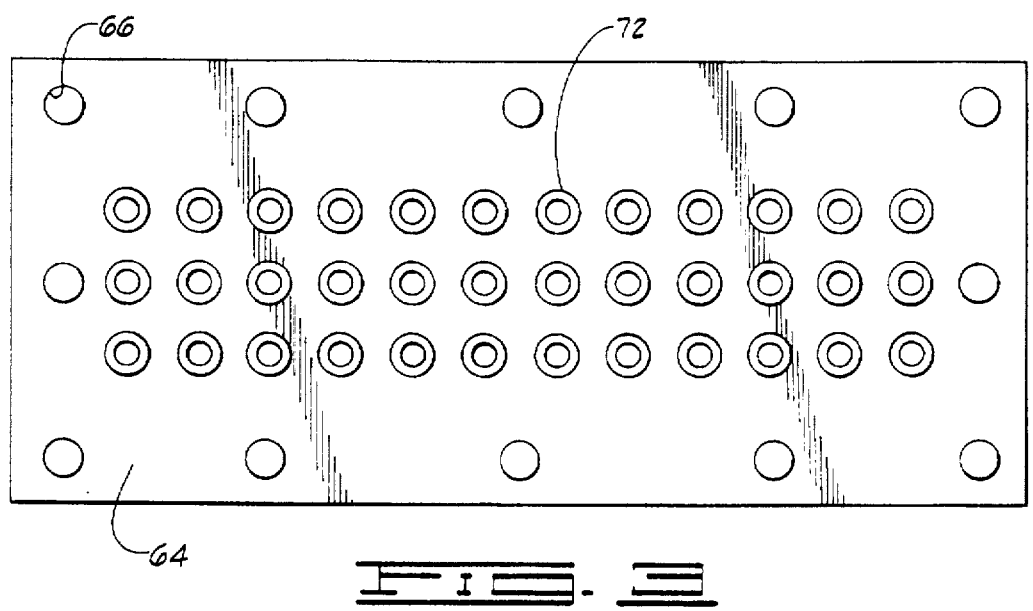

SEALED PASSAGE FOR ELECTRICAL LEADS ACROSS A BARRIER

BACKGROUND OF THE INVENTION

This invention relates particularly, but not by way of limitation, to a transformer housing providing a sealed passage for electrical leads from the transformer. More generally, it relates to an interface for communicating a plurality of electrical leads across a barrier, such as through a wall of the transformer housing.

A transformer housing with which a particular aspect of the present invention is concerned has a chamber defined in it. This chamber receives a transformer and an insulating fluid (e.g., oil). The transformer includes one or more primary and secondary windings which must be connected to power inputs and outputs located outside the chamber. To make these connections, electrical leads are connected to the respective transformer windings and to the respective inputs or outputs. These leads are connected across a wall of the housing which at least in part defines the chamber. This has typically been done using individual units each comprising an electrical member (e.g., a metal rod) and a bushing. These units are mounted in the wall of the transformer housing and electrical connections are made to the conductive portion of a unit on each side of the wall. The electrical member passing through the wall preferably is electrically insulated from the wall by the bushing since the wall of the transformer housing is typically made of electrically conductive material, and the bushing preferably seals with the wall to prevent leakage of the fluid from the chamber. An example of one such unit is the "SPEED MOUNT II" secondary bushing from Central Moloney.

Because these individual units have bare terminals to which the connections are made, adequate clearance space must be provided between adjacent units. Use of these units is labor intensive as the individual electrical connections are manually made. These combination electrical member/bushing units are also expensive. There is thus the need for an improved interface which provides a sealed, electrically insulated passage across a barrier, such as a transformer housing wall, in a more compact and less expensive manner than the aforementioned individual electrical member/bushing units. There is also the need for such an interface to provide for the electrical communication across the barrier without having to make all the individual connections required with existing bushing units.

SUMMARY OF THE INVENTION

The present invention overcomes the above-noted and other shortcomings of the prior art by providing a novel and improved transformer housing providing a sealed passage for electrical leads from the transformer. In a more general aspect, the present invention provides an interface for communicating a plurality of electrical leads across a barrier, such as a wall of the housing.

The present invention provides a bank of sealed, insulated passages across a barrier, such as a wall of a transformer housing. The insulated passages enable continuous electrical leads to pass through the barrier without having to be connected to terminals on opposite sides of the barrier as required with the conventional combination electrical member/bushing units mentioned above. This reduces both the cost of the interface and the amount of labor to use it relative to such prior devices. The present invention also requires less space than an equivalent number of such conventional units.

As to the interface of the present invention, it broadly comprises an assembly of heat shrink tubes each having an axial aperture for receiving at least one respective electrical lead extending from one side of a barrier to another side of the barrier. The interface preferably further comprises a plurality of bushings, each of the bushings disposed in the axial aperture of a respective one of the heat shrink tubes.

In a preferred embodiment, the interface communicates a plurality of electrical leads through a wall of a housing. In this embodiment, the interface comprises a support member adapted for connecting to a wall of a housing, the support member having a plurality of holes defined therethrough; a plurality of heat shrink tubes disposed adjacent the plurality of holes of the support member; and adhesive means for fluid tightly connecting the heat shrink tubes to the support member. This embodiment preferably further comprises a plurality of bushings disposed through the support member, each of the bushings providing through the support member an electrically insulated passage for receiving an electrical lead.

As to the overall transformer housing of the present invention, it broadly comprises means for defining a chamber adapted to receive a transformer and an insulating liquid, which means includes a wall having an inner surface against which the insulating liquid is disposed and having an outer surface against which a gas is disposed. This housing further comprises an assembly of heat shrink tubes connected to the wall, each of these heat shrink tubes having an aperture for receiving at least one respective electrical lead adapted to extend from a transformer disposed in the liquid in the chamber, through the wall, to a connection in the gas outside the chamber.

Therefore, from the foregoing, it is a general object of the present invention to provide a novel and improved transformer housing providing a sealed passage for electrical leads from the transformer. It is also a general object to provide a novel and improved interface for communicating a plurality of electrical leads across a barrier. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 1 is a side view of a transformer housing embodying the present invention.

FIG. 2 is another side view of the transformer housing shown in FIG. 1.

FIG. 3 is a side view of the preferred embodiment of the interface of the present invention.

DETAILED DESCRIPTION OF PREFERRED EMBODIMENT

Figure 4:
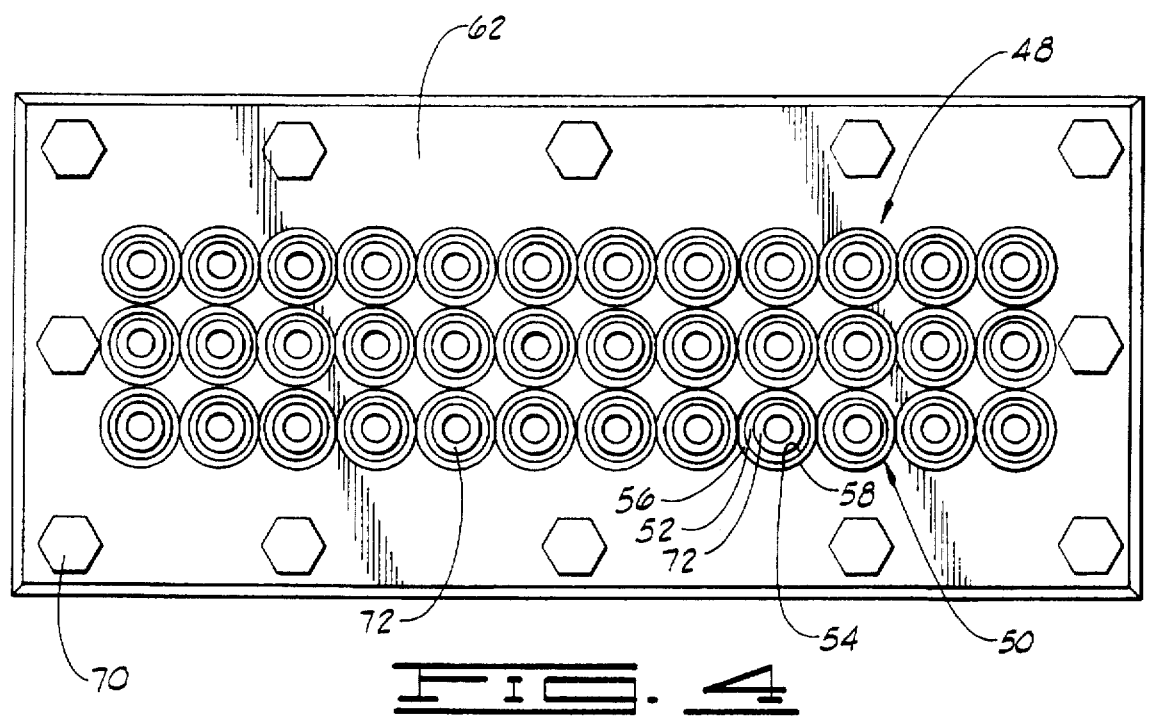
FIG. 4 is an opposite side view of the interface shown in FIG. 3.

Although the interface of the present invention has application to any barrier across which electrical connections need to be made, particularly those where individual combination electrical member/bushing units have been used, the present interface will be described specifically with regard to a transformer housing 2.

The transformer housing 2 embodying the present invention is shown in FIGS. 1 and 2. The transformer housing 2 includes means for defining a chamber 4 which is adapted to receive a transformer 6 and an insulating liquid 8, such as oil, in known manner. The chamber 4 is defined at least in part by a wall 10 having an inner surface 12 against which the insulating liquid 8 is disposed and having an outer surface 14 against which a gas is disposed. In the illustrated embodiment, the gas is ambient air. In the embodiment of FIGS. 1 and 2, the chamber 4 is also defined by three other side walls and upper and lower walls, none of which is relevant to the claimed invention other than as forming the otherwise conventional structure of the chamber defining means (i.e., the wall 10 is the barrier to be crossed in this embodiment).

The wall 10 of the transformer housing 2 has an opening across which is mounted an interface 16 for communicating a plurality of electrical leads through the wall 10. In the preferred embodiment, the interface 16 is removable so that the interface 16 can be replaced without having to reconstruct the overall transformer housing 2. It is contemplated, however, that the subsequently described interface 16, or at least parts of it, can be directly applied to permanent structure of the chamber defining means of the transformer housing 2; but as implemented in the preferred embodiment, the interface 16 is adapted for mounting adjacent a relatively large single opening through the wall 10 rather than a plurality of smaller openings which could be defined through the wall 10 as will become apparent following a description of the preferred embodiment of the interface 16.

Although not relevant to the present invention, the embodiment of the transformer housing 2 shown in FIGS. 1 and 2 also includes output voltage selection terminals 18 and input voltage selection terminals 20. Also mounted on the wall 10 are starter contactors 22, a magnetic disconnect 24 and current transformers 26. Input terminals 28 and output terminals 30 are also illustrated. A door 32 is connected to a frame 34 which is attached adjacent the wall 10 for defining a compartment, and mounted on the door 32 are indicator lights 36, hand-off-auto switch 38 and start pushbutton 40. A motor controller 42 and a control power fuse 44 are also mounted on the door 32. Also contained in this compartment is an overload relay 46.

To utilize the foregoing components, electrical leads must be connected between respective elements mounted in the compartment just described and respective locations of the windings of the transformer 6 housed inside the chamber 4 of the transformer housing 2 (an exemplary lead 47 is illustrated in FIG. 2). This requires that these electrical leads pass through the wall 10 between the air environment in the compartment defined by the frame 34 and the liquid environment in the chamber 4. This is accomplished using the interface 16 of the present invention. The preferred embodiment of the interface 16 is shown in FIGS. 3–5.

Figure 5:
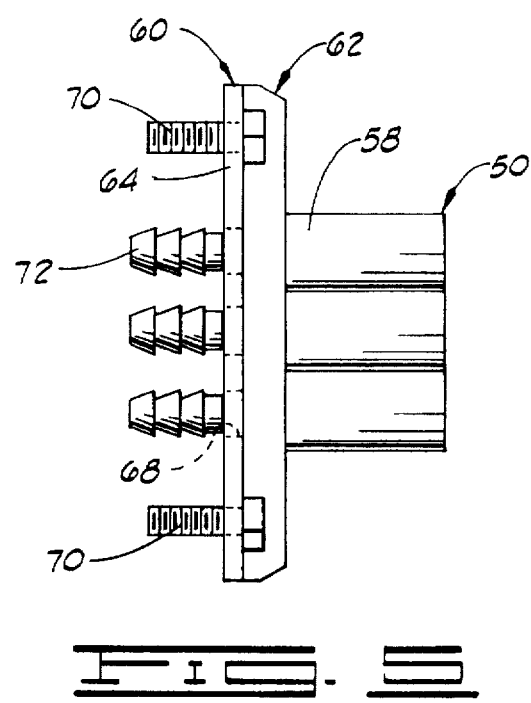
FIG. 5 is an end view of the interface shown in FIGS. 3 and 4.

The preferred embodiment of the interface 16 broadly comprises an assembly 48 of heat shrink tubes 50 as identified in FIGS. 1 and 4. Referring to FIG. 4, each of the heat shrink tubes 50 has an axial aperture 52 for receiving at least one respective continuous electrical lead extending from the transformer 6 disposed in the chamber 4 of the housing 2 to a connection outside the chamber 4. Each aperture 52 is bounded by a cylindrical inner surface 54 of an annular wall 56 also having a cylindrical outer surface 58 in the illustrated preferred embodiment. The heat shrink tubes 50 can be made of any suitable substance, such as a thermoplastic having an adhesive coating of a type commercially available.

Although the heat shrink tubes 50 can be directly connected to the wall 10 of the housing 2, in the preferred embodiment the tubes 50 are connected to the wall 10 by means including both a support member 60 (FIG. 5) and adhesive means 62 (FIGS. 4 and 5) for fluid tightly connecting the tubes 50 to the support member 60.

The support member 60 is adapted for connecting to the wall 10. In the preferred embodiment it is implemented by a rectangular metal plate 64 (FIGS. 3 and 5) having a plurality of peripheral holes 66 and a plurality of central holes 68 defined through the thickness of the plate. The peripheral holes 66 receive a respective plurality of bolts 70 (bolt heads are shown only in FIG. 4 and only two shanks are shown in FIG. 5 so that other features are visible in the views of FIGS. 3–5; all the shanks are depicted in FIG. 1). The bolts 70 are adapted for being inserted through, and extracted from, corresponding openings defined in the wall 10 so that the interface 16 can be replaced without reconstructing the rest of the transformer housing 2. That is, the support member 60, and thus the interface 16, can be attached to and removed from the rest of the transformer housing.

The central holes 68 are defined in any desired array and are of sufficient number to accommodate the number of electrical leads which need to be fed across the boundary defined by the wall 10. In the preferred embodiment, there is a respective heat shrink tube 50 associated with each hole 68.

Also associated with each hole 68 in the preferred embodiment of the interface 16 is a respective one of a plurality of bushings 72 (FIGS. 3–5). Each of the bushings 72 is disposed in the axial aperture 52 of the respective heat shrink tube 50. Each of the bushings 72 is made of a suitable electrically insulating material, such as a suitable plastic, so that each bushing provides an electrically insulated passage for receiving the one or more electrical leads received by the respective tube 50. In the preferred embodiment, the bushings 72 are plastic tubes. Whereas each bushing 72 passes through the respective central hole 68 of the support plate 64 so that the ends of the bushings 72 extend on opposite sides of the plate 64, the respective tube 50 is disposed about only one end of the respective bushing 72 and extends from only one side of the plate 64. In this manner, each of the heat shrink tubes 50 is adapted for sealing around one end of the respective bushing and the one or more electrical leads passing therethrough.

Each of the sets of tubes 50/bushings 72 is secured to the support plate 64 by the adhesive means 62, which in the preferred embodiment includes a layer of a suitable resin, such as epoxy resin, disposed on the side of the plate 64 from which the tubes 50 extend. This layer of epoxy fluid tightly secures not only the tubes 50, but also the bolts 70 as is apparent from FIGS. 4 and 5 showing the substantially transparent layer of epoxy extending completely to the edges of the one side of the plate 64.

The interface 16 can be made by cutting the plate 64 to a suitable size and drilling the desired holes 66, 68 through the plate. The bolts 70 are inserted through the peripheral holes 66 and the bushings 72 are inserted through the central holes 68, the tubes 50 are placed over the ends of the bushings 72 commonly projecting from one face of the plate 64, and then epoxy is poured over this face of the plate to a desired thickness in a suitable mold. Once the epoxy sets, the interface 16 can be attached to the wall 10 by inserting the protruding portions of the bolts 70 through corresponding holes in the wall 10. Nuts (not shown) are threaded on the bolts to secure the assembly to the wall 10. A gasket or other seal can be used between the plate 64 and the wall 10 to fluid tightly seal the connection therebetween.

Either before or after mounting the interface 16 to the wall 10, the electrical leads are fed through the respective sets of tubes 50/bushings 72 with sufficient lengths left on both sides to allow for the connections within the chamber 4 and within the external compartment defined by the frame 34. Alternatively, one end of each electrical lead can be connected to its desired location and then the free end fed through the interface 16 on to its electrical connection. In any event, once the continuous electrical leads are properly fed through and positioned relative to the interface 16, sufficient heat is applied to the tubes 50 in known manner (e.g., by a heat gun or oven) so that the tubes 50 shrink and conform to the outer shapes of the electrical leads and the bushings 72 (if used), in this way creating fluid tight seals therewith.

If the interface 16 needs to be changed, the electrical leads can be cut or otherwise disconnected, the nuts securing the bolts 70 removed, and the interface 16 separated from the wall 10.

Although it is preferred to use the bushings 72, it is contemplated that sufficient fluid tight sealing can be provided by the tubes 50 alone if adequate insulation relative to the plate 64 is provided by intrinsic insulation of the electrical leads or otherwise (e.g., the tubes 50 themselves could be configured to extend through the plate 64).

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. An interface for communicating a plurality of electrical leads through a wall of a housing, said interface comprising:
   a support member adapted for connecting to a wall of a housing, said support member having a plurality of holes defined therethrough;
   a plurality of heat shrink tubes disposed adjacent said plurality of holes of said support member; and
   a layer of adhesive disposed along a surface of said support member fluid tightly connecting said heat shrink tubes to said support member.

2. An interface as defined in claim 1, wherein said adhesive means includes a layer of resin disposed on one side of said support member so that said layer fluid tightly secures said heat shrink tubes to said support member.

3. An interface as defined in claim 1, further comprising a plurality of bushings disposed through said support member, each of said bushings providing through said support member an electrically insulated passage for receiving an electrical lead.

4. An interface as defined in claim 3, wherein said heat shrink tubes are disposed about said bushings and extend from one side of said support member, each of said heat shrink tubes adapted for sealing around a respective bushing and electrical lead passing therethrough.

5. An interface as defined in claim 4, wherein said adhesive includes a layer of resin disposed on said one side of said support member so that said layer fluid tightly secures said heat shrink tubes to said support member.

6. An interface as defined in claim 1, wherein:
   said support member includes a plate having said plurality of holes defined therethrough, said holes including a plurality of peripheral holes and a plurality of central holes; and said interface further comprises a plurality of bolts disposed in said peripheral holes, said bolts adapted for being inserted through, and extracted from, openings defined in the wall of the housing so that said interface can be replaced without reconstructing the housing.

7. An interface as defined in claim 6, further comprising a plurality of bushings disposed in said central holes of said plate, each of said bushings providing through a respective one of said central holes an electrically insulated passage for receiving an electrical lead connected to a transformer disposed in the housing.

8. An interface as defined in claim 7, wherein said heat shrink tubes are disposed about said bushings and extend from one side of said plate, each of said heat shrink tubes adapted for sealing around a respective bushing and electrical lead passing therethrough.

9. An interface as defined in claim 8, wherein said adhesive means includes a layer of resin disposed on said one side of said plate so that said layer fluid tightly secures said bolts and said heat shrink tubes to said plate.

10. A transformer housing, comprising:
    means for defining a chamber adapted to receive a transformer and an insulating liquid, said means including a wall having an inner surface against which the insulating liquid is disposed and having an outer surface against which a gas is disposed;
    an assembly of heat shrink tubes, each of said heat shrink tubes having an aperture for receiving at least one respective electrical lead adapted to extend from the transformer when such transformer is disposed in the liquid in the chamber, through the wall, to a connection in the gas outside said chamber; and
    means for connecting said assembly of heat shrink tubes to said wall, said means including a layer of adhesive disposed across a surface through which said assembly of heat shrink tubes extends so that said layer fluid tightly secures said heat shrink tubes thereto.

11. A transformer housing as defined in claim 10, further comprising a plurality of bushings, each of said bushings disposed in the aperture of a respective one of said heat shrink tubes.

12. A transformer housing as defined in claim 10, wherein said means for connecting further includes a support member connected to said wall, said support member having said heat shrink tubes and said adhesive connected thereto.

13. A transformer housing as defined in claim 12, further comprising a plurality of bushings disposed through said support member, each of said bushings providing through said support member an electrically insulated passage for receiving the at least one respective electrical lead.

14. A transformer housing as defined in claim 13, wherein said heat shrink tubes are disposed about said bushings and extend from one side of said support member, each of said heat shrink tubes adapted for sealing around a respective bushing and the at least one respective electrical lead passing therethrough.

15. A transformer housing as defined in claim 14, wherein said adhesive includes a layer of resin disposed on said one side of said support member so that said layer fluid tightly secures said heat shrink tubes to said support member.

16. A transformer housing, comprising:
    means for defining a chamber adapted to receive a transformer and an insulating liquid, said means including a wall having an inner surface against which the insulating liquid is disposed and having an outer surface against which a gas is disposed and having an opening defined therethrough;

a support member fluid tightly but releasably connected to said wall to fluid tightly close said opening therethrough;

an assembly of heat shrink tubes connected to said support member, each of said heat shrink tubes having an aperture for receiving at least one respective electrical lead adapted to extend from the transformer when such transformer is disposed in the liquid in the chamber, through said wall, to a connection in the gas outside said chamber;

a layer of adhesive fluid tightly connecting said heat shrink tubes to said support member; and wherein said fluid tightly, releasably connected support member is removable from said wall so that said support member and said heat shrink tubes connected thereto can be replaced without reconstructing said means for defining said chamber.

17. A transformer housing, comprising:

means for defining a chamber adapted to receive a transformer and an insulating liquid, said means including a wall having an inner surface against which the insulating liquid is disposed and having an outer surface against which a gas is disposed and having an opening defined therethrough;

a support member fluid tightly but releasably connected to said wall to fluid tightly close said opening therethrough, said support member including a plate having a plurality of peripheral holes and a plurality of central holes;

a plurality of bolts disposed in said peripheral holes, said bolts adapted for being inserted through, and extracted from, additional openings defined in said wall;

an assembly of heat shrink tubes connected to said support member, each of said heat shrink tubes having an aperture for receiving at least one respective electrical lead adapted to extend from the transformer when such transformer is disposed in the liquid in the chamber, through said wall, to a connection in the gas outside said chamber;

a plurality of bushings disposed in said central holes of said plate, each of said bushings providing through a respective one of said central holes an electrically insulated passage for receiving the at least one respective electrical lead received by a respective one of said heat shrink tubes, wherein said heat shrink tubes are disposed about said bushings and extend from one side of said plate, each of said heat shrink tubes adapted for sealing around a respective bushing and any said electrical lead passing therethrough;

a layer of resin disposed on said one side of said plate so that said layer fluid tightly secures said bolts and said heat shrink tubes to said plate; and wherein said fluid tightly, releasably connected support member is removable from said wall so that said support member and said heat shrink tubes connected thereto can be replaced without reconstructing said means for defining said chamber.

* * * * *

UNITED STATES PATENT AND TRADEMARK OFFICE
CERTIFICATE OF CORRECTION

Patent No.:   5,635,674

Dated:   June 3, 1997

Inventor:   Donald W. Owen

It is certified that errors appear in the above-identified patent and that said Letters Patent is hereby corrected as shown below:

```
Column 5, line 46, delete "means".

Column 6, line 18, delete "means".
```

Signed and Sealed this

Twenty-sixth Day of August, 1997

Attest:

BRUCE LEHMAN

*Attesting Officer*   *Commissioner of Patents and Trademarks*